(12) United States Patent
Maier

(10) Patent No.: US 11,899,343 B2
(45) Date of Patent: Feb. 13, 2024

(54) METHOD AND DEVICE FOR CONTROLLING MOTORS IN THE FILM AND BROADCAST INDUSTRY

(71) Applicant: Florian Maier, Raisting Bayern (DE)

(72) Inventor: Florian Maier, Raisting Bayern (DE)

( * ) Notice: Subject to any disclaimer, the term of this patent is extended or adjusted under 35 U.S.C. 154(b) by 0 days.

(21) Appl. No.: 17/612,771

(22) PCT Filed: May 8, 2020

(86) PCT No.: PCT/EP2020/062943
§ 371 (c)(1),
(2) Date: Nov. 19, 2021

(87) PCT Pub. No.: WO2020/234011
PCT Pub. Date: Nov. 26, 2020

(65) Prior Publication Data
US 2022/0244622 A1 Aug. 4, 2022

(30) Foreign Application Priority Data
May 20, 2019 (DE) ............. 10 2019 003 510.0

(51) Int. Cl.
G03B 17/18 (2021.01)
G03B 13/18 (2021.01)
G03B 13/34 (2021.01)
G06F 3/01 (2006.01)

(52) U.S. Cl.
CPC ............ *G03B 17/18* (2013.01); *G03B 13/18* (2013.01); *G03B 13/34* (2013.01); *G06F 3/016* (2013.01)

(58) Field of Classification Search
CPC .......... G03B 17/18; G03B 13/18; G06F 3/016
See application file for complete search history.

(56) References Cited

U.S. PATENT DOCUMENTS

| 5,059,019 A | 10/1991 | McCullough |
| 2005/0156892 A1 | 7/2005 | Grant |
| 2007/0279401 A1 | 12/2007 | Ramstein et al. |
| 2008/0225234 A1* | 9/2008 | Bauer ................. H04N 5/2251 348/E5.045 |
| 2014/0063278 A1* | 3/2014 | Voss ...................... G03B 13/34 348/211.99 |

(Continued)

FOREIGN PATENT DOCUMENTS

| DE | 19712049 | 9/1998 |
| DE | 19926597 A1 | 12/2000 |

(Continued)

OTHER PUBLICATIONS

International Search Report issued by the European Patent Office in International Application PCT/EP2020/062943.

(Continued)

*Primary Examiner* — Minh Q Phan
(74) *Attorney, Agent, or Firm* — Henry M. Feiereisen LLC

(57) ABSTRACT

In a method and a device for controlling or regulating motors for movement axes of devices in the film and broadcast sector, at least one motor is controlled via radio or via cable by a control unit of processing unit having at least one control element. An electromechanical element can apply on the control element a force that generates a haptic feedback. This force can be changed dynamically by entered or read-out parameters and can be manually overridden.

28 Claims, 3 Drawing Sheets

(56) References Cited

U.S. PATENT DOCUMENTS

Figure 1:
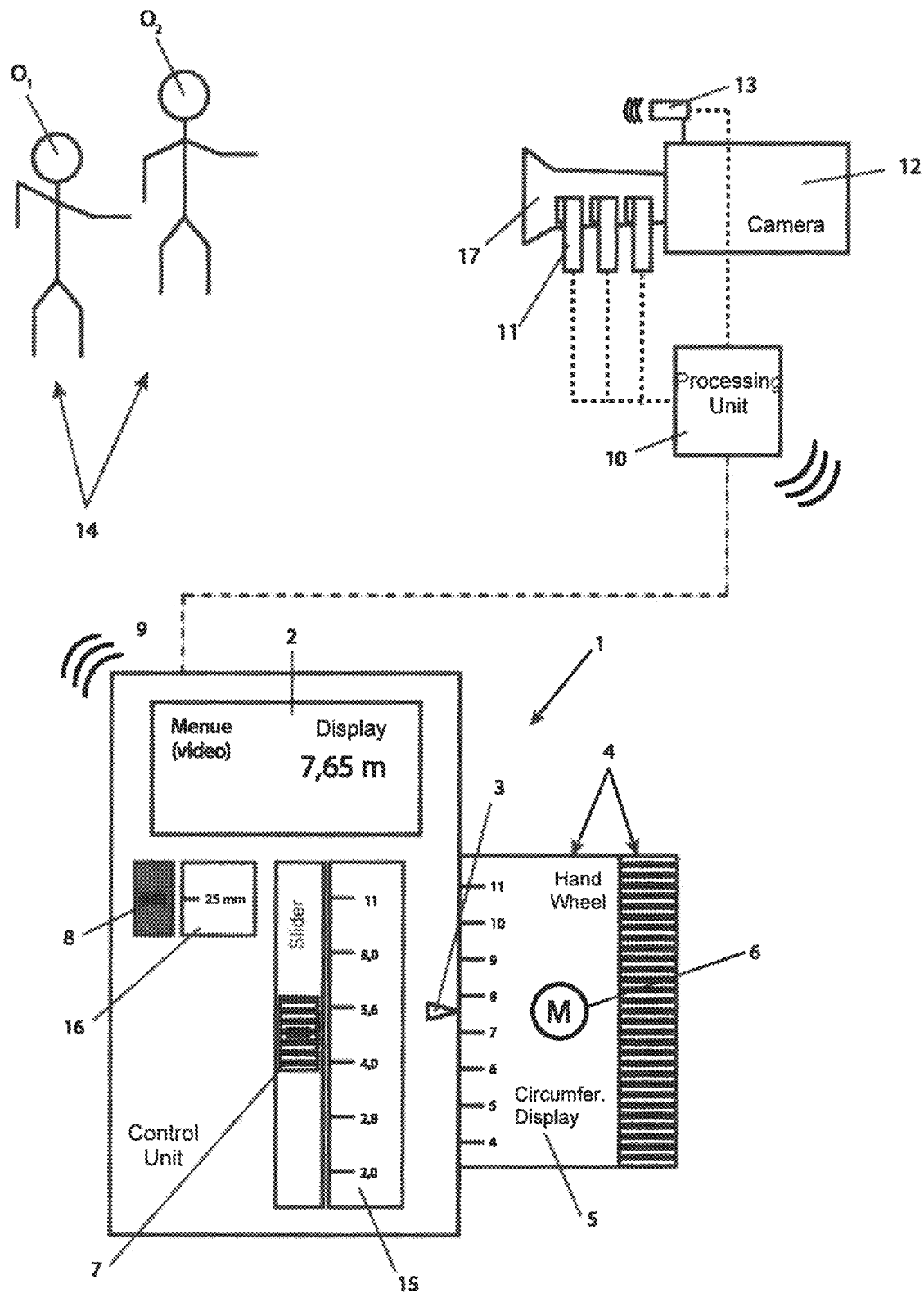

2016/0088212 A1* 3/2016 Narang ................ H04N 5/2251
2016/0088212 A1* 3/2016 Narang ................ 348/348

FOREIGN PATENT DOCUMENTS

| DE | 102004015947 | | 10/2005 |
| --- | --- | --- | --- |
| DE | 202009014504 | U1 | 2/2010 |
| DE | 102011121021 | | 6/2013 |
| DE | 102015110633 | | 1/2017 |
| DE | 102016118460 | A1 | 3/2018 |
| EP | 1918196 | A1 | 5/2008 |
| EP | 2706407 | A2 | 3/2014 |
| WO | WO 9725657 | A1 | 7/1997 |

OTHER PUBLICATIONS

Arnold & Richter Cine Technik Gmbh & Co. Betriebs KG: WCU—4 wireless compact unit—User manual. Version 08. Munich, 2018. p. 1-99.

* cited by examiner

METHOD AND DEVICE FOR CONTROLLING MOTORS IN THE FILM AND BROADCAST INDUSTRY

CROSS-REFERENCES TO RELATED APPLICATIONS

This application is the U.S. National Stage of International Application No. PCT/EP2020/062943, filed May 8, 2020, which designated the United States and has been published as international Publication No. WO 2020/234011 A1 and which claims the priority of German Patent Application, Serial No. 10 2019 003 510.0, filed May 20, 2019, pursuant to 35 U.S.C. 119(a)-(d).

BACKGROUND OF THE INVENTION

The invention relates to a method and a device for controlling or regulating motors in the film and broadcast sector.

STATE OF THE ART

In the film sector, focus, iris and zoom have so far usually been controlled electronically via external motors attached to the lenses of a camera. Using a handheld control unit, which usually has a hand wheel for the focus, a slider for the aperture and possibly a kind of joystick for the zoom setting, the user can control up to three motors attached to the lens from a distance, each of which then controls the focus, aperture and possibly zoom. Data transmission is usually wireless. The Input devices usually have potentiometers or Incremental encoders which, for example, detect the respective position of the hand wheel and pass it on to the motors. Such an input device usually has two fixed end stops. Within the scope of a calibration, these end stops are assigned to the end stops of the lens, i.e. the rotation range of nearly one rotation is assigned to the rotation range of the lens. Deviating from this, a small range of the lens can also be assigned to the entire rotation range of the input device in order to be able to control even more finely (DE 10 2004 015 947 A1). The same applies to the control of so-called remote heads (swiveling camera heads), or camera cranes, which are controlled via either joystick, slider or hand wheels.

Problem Definitions

There are several problems with the control methods commonly used to date. In the case that the entire rotation range of the input device is only assigned to a small area of the lens in order to be able to control it even more finely, there is the problem that only the small area of the lens can be controlled with the entire rotation range of the input area and not the entire area of the lens. This means that if you want to control a little further beyond this spread range because the situation in front of the camera requires it, you are already at the mechanical end stop of the hand wheel and cannot turn any further.

Another problem is that the user only gets visual feedback via a display, but no haptic feedback at all. There is a known system that, at a certain mark, triggers a small motor with an imbalance, causing the entire handheld control unit to vibrate (ARRI WCU-4 Wireless Compact Unit, USER MANUAL, Dec. 12, 2018). However, this has two disadvantages: The hand wheel itself does not vibrate, but the entire unit does; thus, it is not very intuitive and feels strange or not related to the respective axis (e.g., focus, iris, zoom).

In addition, it is difficult to move to the intended position accurately because human reaction time is too slow for fast control movements. On the other hand, this can only signal the mark of a single axis, because if the entire device vibrates, it is not possible to understand which axis is actually involved in the case of several axes.

Furthermore, a temporary sluggishness of a controlled axis caused e.g. by obstacles, for example a cable being in the way and thus blocking the mechanical adjustment device, cannot be shown. In existing systems, an adjustable friction of the adjusting device can only be set mechanically for the entire control element uniformly by changing a lock nut.

Another problem is that if the respective motor on the lens is adjusted manually in the meantime, the assignment of the position of the lens (or generally: the driven mechanics) no longer corresponds to the position of the hand wheel. So far there are only two possibilities: A recalibration, through which the end stops of the lens are again assigned to the end stops of the hand wheel, or, as long as the encoders of the respective motor have continuously sent their positions to the input device, driving the respective motor to the set hand wheel position. In the example given, however, this also changes the image content due to the now changed focus, iris or zoom setting, which is to be avoided in most cases. Similar problems also occur with other driven mechanics.

Furthermore, it is not possible with the present devices to enable an assisted so-called focus pulling (or in another example: an assisted panning of a camera head). This means that the user is not provided with any assistance for precise focusing (or assistance for precise panning of a camera head), except for the visual indication of the distance of the object to be focused from the camera on an external display by means of distance measuring devices. However, the user is not relieved from the focus pulling itself. There are some initial ideas for automatic focusing, but both modes of operation are mutually exclusive: either the user operates the focus itself or the automatic system focuses on its own. The state of the art does not provide for both at the same time. There is only the hard switch between the two modes, which must be actively switched (DE 10 2004 015 947 A1).

Another problem concerns the assignment of real input values to the position of the input device. Although there are approaches to place a display on a cylinder sector of the hand wheel, this is limited to the width of the two end stops (DE 10 2011 121 021 A1).

DE 197 12 049 A1 describes an operating device for manual input of information into a device. US 2003/0184, 518 A1 describes a device with haptic feedback, which consists of an operating unit, a drive element generating the haptic feedback and a control unit for the drive element. DE 10 2015 110 633 A1 discloses a haptic operating unit and a method for operating vehicles, wherein a haptic operating device with a rotary unit is used and selectable menu items are displayed on a display unit, and wherein a menu item is selected by rotating the rotary unit. US 2007/027 9401 A1 describes a system and method for a rotary movement in a hybrid haptic device comprising a knob rotatably mounted on a base plate via a shaft.

All four of the latter publications have in common that the methods and devices described therein merely imitate mechanical behavior electronically.

SUMMARY OF THE INVENTION

The problems of the above limitations are solved by a method or respectively device as set forth hereinafter.

The present invention relates to the control or regulation of motors via radio or cable, at least indirectly, for movement axes of devices in the film or broadcast sector comprising a processing unit and an operating unit, such as a handheld unit. Hereby, the axes of movement are fixed to a mechanical system by two limits/end stops. In this case, the operating unit comprises at least one control element with a built-in electromechanical element which can generate a dynamic haptic feedback on this control element. The control element may be a hand wheel, a slider or a joystick. The electromagnetic element can be a brushless motor, for example, which can exert a force on the control element by input or read parameters, possibly via a gearbox, can be dynamically variable, and can further be manually overridden. Such a parameter can be the distance of an object to the recording camera, but also a change of state of the object, e.g. a bursting of a balloon, where at this moment the focus should be on another object.

The method and the device for carrying it out will be described below using the hand wheel as an example. Of course, the principles explained can be transferred analogously to a slider or a joystick. The rotary movement is then a linear movement in the case of the slider and the deflection from the zero point in the case of the joystick.

The invention provides that the hand wheel is equipped with a suitable motor and, optimally, rotation angle sensors for the incremental or absolute position of the hand wheel. By means of parameters entered or read out at further devices or motors, this force on the hand wheel is to be dynamically adjustable. By "dynamic" it is also understood that a certain state of the force on the hand wheel does not have to change over a certain period of time, but can nevertheless be changed at any time without mechanical intervention by the user (i.e. without readjusting the friction of a hand wheel by means of an adjusting screw) and be set into another state.

If the force calculated by the processing unit is applied to the hand wheel, the hand wheel is either blocked or more sluggish for the user, or it supports turning by hand or moves by itself to a certain position or at a defined speed in a certain direction. If no such force is applied to the hand wheel, the hand wheel is free to rotate for the user without much resistance and can be used similarly to a normal hand wheel. The force on the hand wheel can be adjusted individually and dynamically with the corresponding parameters. Nevertheless, it is possible for the user to superimpose an additional force on the hand wheel, whereby a processing unit may be able to detect this superimposed force and, if necessary, react accordingly, as will be explained later with examples. Input or read-out parameters can be calculated by the processing unit from the values of a distance sensor of recording objects to the camera or from the object to be controlled (for example, the distance of an actor to the camera or to a spotlight controlled by the device according to the invention). From this, a static or dynamic signal is generated, which is transmitted via radio or cable and is used to control the motor built into the control element, which generates the force for the haptic feedback on the control element.

Figure 3:
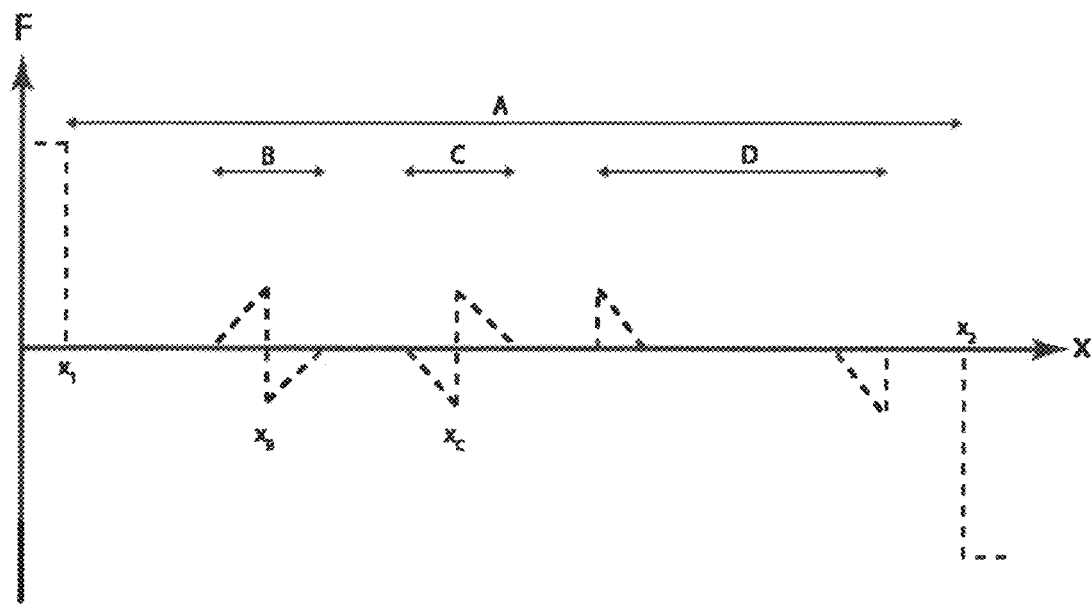

The method and device of the invention can simulate virtual end stops (FIG. 3: A). For example, if the user turns the hand wheel 4 past an end stop (FIG. 3: $x_1$ or $x_2$), a counterforce is generated and the hand wheel moves back "resiliently". The counterforce can also be so strong that the user can no longer move the hand wheel beyond the stop point.

Any "marks" (FIG. 3: B; C; D) can be set. These can be transmitted to the control element as haptic feedback. In this way, a mechanical resistance dip can be created: If the mark on the hand wheel comes into the immediate vicinity of the reference point 3 by rotation, the mark is "attracted" and thus the rotation of the hand wheel is accelerated until it is at the extreme point (FIG. 3: $x_B$), after which a counterforce is built up which becomes weaker and weaker the further the mark moves away from the reference point. This simulates a dip or "hole" (FIG. 3: B). There is also the reverse case. An increasing resistance can be simulated: The closer the mark gets to the reference point, the stronger a counterforce becomes, until the peak is reached (FIG. 3: $x_C$), from then on it behaves the other way round (FIG. 3: C). Any pattern (raised or recessed plateau, rattle, checker plate, signals similar to Morse code, vibration, dynamic or static sluggishness/smoothness, monitoring of a defined intermediate area (FIG. 3: D), etc.) can also be simulated.

A dynamic friction when turning the hand wheel, which can be adjusted electronically, does not exist so far. Therefore, the invention also provides for simulating any kind of lightness or sluggishness of a movement axis on the hand wheel. For example, by measuring the required current on the motor, it can be determined how stiff an axis is or how much load is applied to it. A processing unit can readjust this by applying an appropriate counterforce to the hand wheel. Thus, it acts as if the actual sluggishness of an axis (and thus the force that a motor must apply) is transferred to the hand wheel. This behavior can be provided with a scaling factor as desired (i.e. strengthen or weaken) or can be designed dynamically according to certain specifications or other influencing factors.

Figure 2:
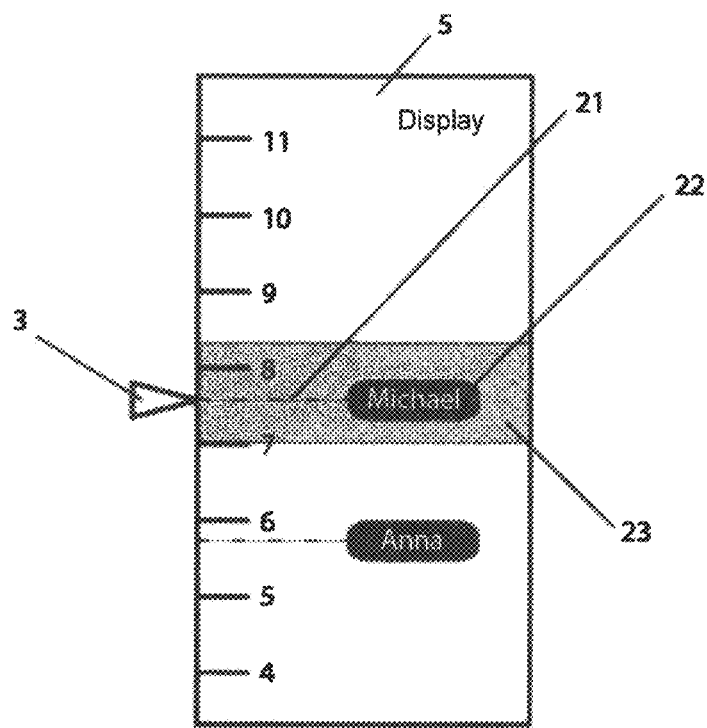

In order to provide the user with the assignment of the hand wheel rotation to the current values on the lens or a mechanical movement axis (e.g. remote head on a camera crane) at any time, so far only a manually inscribable ring has been used, which can at best be updated by rewriting or replacing it. In order to hit certain markings (marks) or to get current information about the state or sluggishness of the motor-driven motion axis, a display or so-called ePaper can be used, which is arranged next to the control element (completely encompasses the hand wheel) and displays the positions of the objects (object assignment) or other information. In contrast to DE 10 2011 121 021 A1, this display is arranged practically seamlessly around the rotating cylinder of the hand wheel to enable, for example, several rotations of the hand wheel to be used for the entire adjustment range of the lens. The scale on the display updates automatically depending on the motor position, so that the entire range of the lens or motor axis can be mapped to several rotations. I.e. the same physical position on the hand wheel is thus reused several times, but with correspondingly different display values. These display values are updated automatically, depending on the position of the hand wheel. An update of the display values is also provided if the lens type/axis type changes. This is entered by the user or, optimally, automatically detected. It is also possible to have a dynamic scale that visualizes the respective resistance of the motor axis (FIG. 5) or displays symbols or texts for certain objects in front of the camera (FIG. 2). In this way, actors' positions can be linked to symbols or texts, with the symbols/texts moving dynamically on the display unit depending on the distance of the real actors from the camera. A display can then be used to select which object in front of the camera is to be followed. This can be selected from the available objects via touch screen, keys or other input options. For example, an actor can be selected, which is then tracked by the distance measuring device and appears on a display on either the control panel or the control element. If he moves in front of the camera and thus changes his distance from the camera, the mark (can also be a descriptive text or an icon) on the display of the hand wheel also moves with him, so that the mark can be followed manually or In the assisted execution mode. In addition, the area around the point of focus can be displayed where the depth of field is the same (depth-of-field range). This allows for very simple operation, as the user only needs to ensure that the object is within the depth-of-field range by appropriate operation.

An assisted execution mode is also possible. In this mode, the control element can independently execute movements (e.g. the hand wheel can rotate), controlled by a computing unit, i.e. move independently to defined points at a defined speed. For example, when the motor on the axis of movement is adjusted by hand and the hand wheel rotates analogously, or when a distance sensor 13 determines the distance to an object 14 (e.g. $O_1$ or $O_2$) in front of the camera or another device specifies a certain setting for the respective motor 11 or respective motors (FIG. 1). On the hand wheel, the assignment of the object to a particular distance is called object assignment 21. The area directly adjacent to or surrounding the object assignment is called object assignment area 22 (FIG. 2). This can be defined in the settings on the control unit and/or the processing unit.

Even in the assisted execution mode, the user has the possibility to intervene and override at any time without active switching. Two cases are possible: in the first case, the control element (in this example, the hand wheel 4) moves by itself and the user can override or readjust the predetermined position in addition to the executed movement of the control element; in the second case, the control element does not move by itself (but the controlled motor 11 does) and the user can add or subtract additional movements to the movement already executed by the processing unit on the motor by moving the control element accordingly. By means of the following example, both cases will be explained: In both cases, an actor 14 (e.g., $O_1$), approaching the camera is to be kept in focus. A distance sensor 13 continuously measures the distance of the actor 14 (e.g. $O_1$) to the camera 12. In the first case, the processing unit continuously adjusts the focus according to the distance and moves the hand wheel analogously. The user nevertheless has the possibility to make corrections to the value given by the processing unit by essentially allowing himself to be guided by the moving hand wheel, but depending on the situation he can change the focus point by applying additional positive or negative force to over- or under-control the hand wheel rotation. In the second case, the processing unit also guides the actor's focus depending on the distance, but does not move the hand wheel to do so. The user now has the option of adding or subtracting an offset to the feed performed by the processing unit with positive or negative rotations around the current point. To make this more user-friendly, the zero point (i.e. the point at which the additional offset is zero) can be located in a dip (FIG. 3: $x_B$).

In order to enable a further variant of the supported execution mode of the hand wheel (i.e., for example, to follow an object 14 with the focus), it is possible to apply a force predetermined by the processing unit to the rotation of the hand wheel in a positive or negative direction, which keeps the user at the correct focus value in a strength determined by setting (similar to a correspondingly sensed magnetic attraction from the object to be followed to the reference point in a defined radius around the object assignment on the hand wheel). Nevertheless, this is not automatic operation in the classical sense. For it is possible to stop the automatic rotation at any time even temporarily by manual intervention (this can also be done by actively overriding from the sphere of influence surrounding the object assignment 21 to be tracked and within which tracking takes place), and at that moment the tracking of the object can be switched off with the appropriate presetting.

It is also possible to activate the assisted mode temporarily, for example, when changing one's grip on the hand wheel by making certain gestures on a control element, in order to ensure continuous operation.

Gestures can be understood as evaluating the impulse or force with which the user turns or stops the hand wheel. Alternatively, this can be understood as the pressure on a possibly pressure-sensitive button. Instead of the button, a sensor on the hand wheel can also detect when the hand releases the hand wheel.

If an object $O_1$ is being tracked in the supported execution mode and the tracking is to be changed to another object $O_2$, the user can leave the first object assignment range by applying a defined additional force to the rotation of the hand wheel and actively change to the second object assignment range while rotating. There, the supported execution mode now focuses on the object $O_2$ to be tracked and from now on this object is tracked further. Alternatively, an object change can also be performed by selection on a screen (e.g. touch screen) 2 or 5.

Instead of automatically focusing on a previously defined point of the object when entering the object mapping area (e.g. automatically focusing on the actors eyes as soon as entering the object mapping area), it is also possible to retain the last setting of the manual focus pull and thus a thereby defined offset to the defined point of the object (e.g. shortly after entering the object mapping area, the back of the head was manually focused with an offset to the actors eyes). This offset is then maintained during the supported execution mode.

In a further assisted execution mode, no force is exerted by the processing unit on the rotation of the hand wheel as long as the object specified by the user is within the depth-of-field range (in this range 23, all objects located even at different distances are in focus). If there is a risk that the user will leave the depth-of-field range 23, the processing unit can ensure that this range is not inadvertently left by exerting an appropriate supporting force on the hand wheel. Only when the user leaves the range with a correspondingly strong force, the processing unit switches off this range limit monitoring supporting mode. This can also be switched off only temporarily and switched on again as soon as a new object enters the depth-of-field range.

Furthermore, it is possible to show the plane-of-focus, the depth-of-field (calculated or measured), the subjects in the shooting set or other useful information on the circumferential display 5 of the hand wheel 4 or the display 2 of the control unit. In this case, the display 5 can either be fixedly connected to the operating part 1, while the display is updated sufficiently quickly and only the hand wheel 4 rotates, or the hand wheel and the circumferential display 5 are one unit and rotate together.

The display on one of the screens can show a bird's eye view or a side perspective symbolically or superimposed on the current video image. In this way, for example, the limits of the focus zone are visible to the user and he can orient himself accordingly during operation. For better visualization, these areas can also be projected into the recording set using a laser or other optical projection mechanism.

It should be emphasized once again that all the methods or devices explained using the example of the hand wheel can also be applied analogously, with adaptations, to other control elements, e.g. a slider or a joystick. In the case of a slider, for example, instead of the rotation applied to several rotations in the case of the hand wheel, the slider can return to its initial position after deflection in an analogous manner.

The aforementioned invention can be used in all areas of film and broadcast. For example, support can be provided for setting lens parameters, operating motion control applications (e.g. swiveling camera head, camera dollies, camera cranes, swiveling light control systems) and other areas of application. In times of higher and higher image resolution, this helps to focus precisely and exactly or to design workflows much faster. In addition, the brightness of spotlights or the like can be controlled. The invention can also be used in other areas of technology.

FIGURE DESCRIPTION

FIGS. 1 to 5 show examples of the device according to the invention as well as force and resistance curves in the process according to the invention.

DETAILED DESCRIPTION

FIG. 1 shows a control unit 1 with a display 2, which has the following control elements: a hand wheel 4, a slider 7 and a joystick 8. A circumferential display 5 is mounted on the hand wheel 4. A display 15 is also attached to the slider and a display 16 is attached to the joystick (rocker). A reference point 3, which is fixedly mounted on the control unit 1, indicates the current state of the motor 11 (for a movement axis of the lens 17) on the circumferential display 5. A motor capable of exerting a force on a control element is shown, by way of example, as a motor 6 in the hand wheel 4. This may also be present in the slider 7 or joystick 8. Via a radio or cable connection 9, the control unit 1 is connected to a motor 11 for driving an axis of a lens 17 via a processing unit 10. The processing unit 10 may alternatively be housed in the control unit 1. A distance meter 13 attached to the camera 12 continuously measures the distance to recording objects 14 ($O_1$, $O_2$).

FIG. 2 shows a section of the circumferential display 5. The reference point 3 is fixed to the control unit 1, while the circumferential display 5 in this variant can rotate with the hand wheel 4. The reference point 3 here shows the current setting on an object. The dashed lines 21 show object assignments, i.e. the assignment of a real object (in this case of the actor "Michael" and the actress "Anna" respectively) to a symbol on the hand wheel 4. A defined area around one particular object assignment 21 is called the object assignment area 22 of the object (dark background area of the name). The depth-of-field area 23 is highlighted in gray and is located around the reference point 3 depending on the calculated depth-of-field.

FIG. 3 shows a graphical representation of the action of a force F, given by the processing unit 10, on the rotary movement as a function of the hand wheel rotation position x. At the position $x_1$ and $x_2$, end stops are shown which define the outer limits of the entire adjustment range A and at which the counterforce on the hand wheel 4 increases abruptly. In the area in between, different force patterns are shown. Area B shows a "dip" where the force on the hand wheel given by the processing unit 10 increases as the extreme point $x_B$ is approached (this may be the desired focus point on an object/object assignment point 21), area C shows a "hill" with the extreme point $x_C$ and thus the reverse case. Area D shows the supporting force that keeps the user in a certain area e.g. depth-of-field area, and at the borders protects against accidentally leaving the area.

Figure 4:
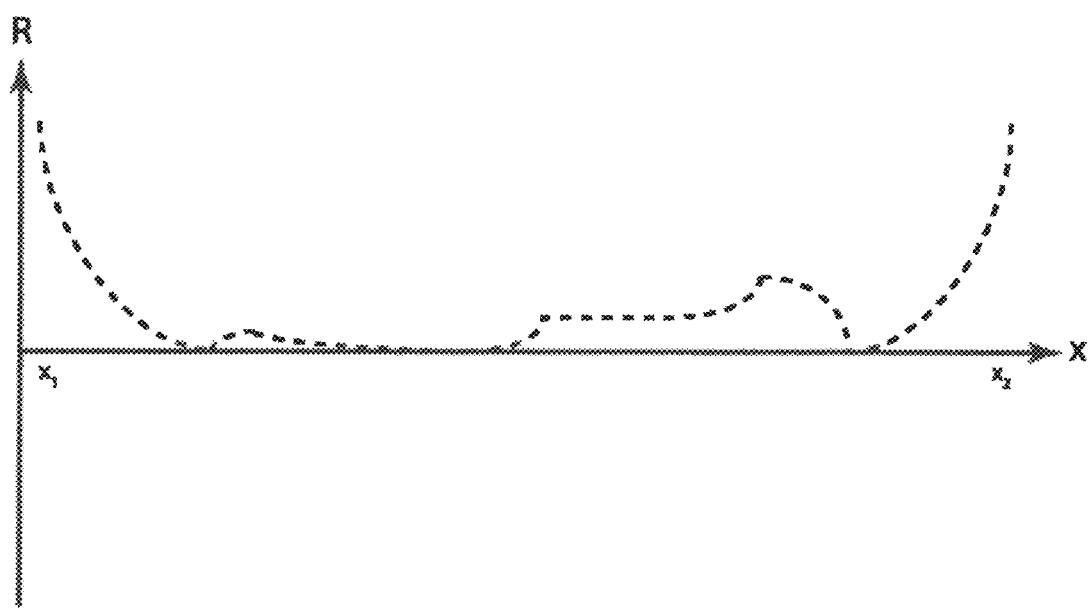

FIG. 4 shows an example of a dynamic resistance R which depends on the position x of the hand wheel 4. It increases steadily towards the outer limits $x_1$ and $x_2$. In the intermediate area, the changing resistance of a mechanical axis is shown, as it can occur in the case of location-dependent sluggishness, can be determined by reading out the motor current and can be converted by the processing unit 10 into corresponding forces on the hand wheel 4.

Figure 5:
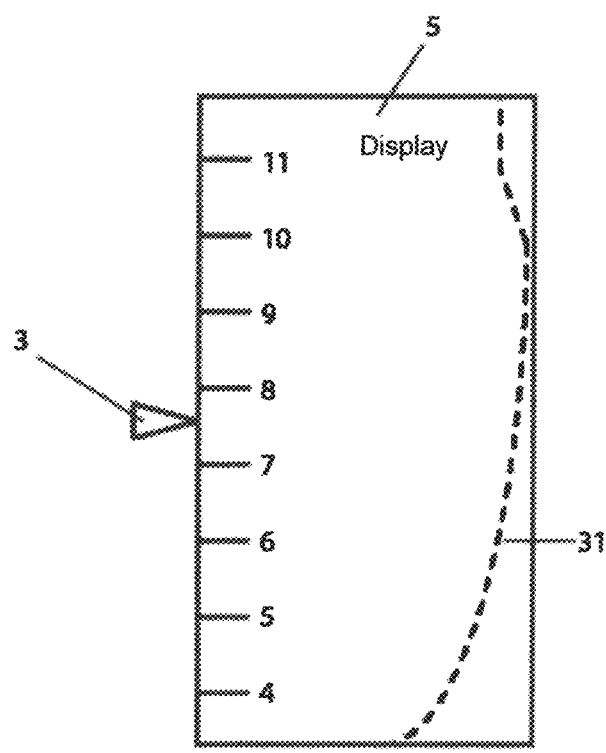

FIG. 5 shows a section of the circumferential display 5. As in FIG. 2, the reference point 3 is fixed to the control unit 1, while in this variant the circumferential display 5 can rotate with the hand wheel 4. The dashed line 31 graphically shows the resistance of the mechanical axis of movement as a function of the position of the hand wheel.

REFERENCE LIST

1 Control unit
2 Display on the control unit
3 Reference point
4 Hand wheel
5 Circumferential display
6 Hand wheel motor (electromechanical element)
7 Slider
8 Joystick (Rocker)
9 Cable or radio connection
10 Processing unit
11 Motor
12 Camera
13 Distance sensor
14 Recording object (here $O_1$ and $O_2$)
15 Display on the slider
16 Display on joystick (rocker)
17 Lens
21 Object assignment
22 Object assignment area
23 Depth-of-field
31 Graphical representation of the mechanical resistance
A Total adjustment range
B Simulated dip
C Simulated hill
D Area in which an object is to be held
X Hand wheel rotation position
$x_1$, $x_2$ End stops
$x_B$, $x_C$ Extrema
F force on the hand wheel
R Resistance of a movement axis

What is claimed is:

1. A method for controlling or regulating with control element a motor for movement axes of devices in the film and broadcast sector, the method comprising:
controlling at least one motor via radio or cable with the control element by
applying, with an electromechanical element disposed in the control element, a dynamic force to the control element in a negative or positive direction of an axis of the control element which generates a haptic feedback while allowing the user to intervene and to manually override the dynamic force at any time without actively switching, and
dynamically changing at least one of a strength a duration and a position of the dynamic force, using entered or read-out parameters generated in dependence on a recording object or of a changing state of the recording object or a state of at least one of the devices, the at least one device selected from a motion control device, a swiveling camera head, a camera dolly, a camera crane, and a light control system, wherein the electromechanical element exerts on the control element a force which causes the control element to move automatically to defined points at a defined speed.

2. The method of claim 1, wherein when the force generated by the electromechanical element on the control element at a certain time or depending on the position of the control element or a position of the recording object, or a combination thereof, is low or substantially non-existent, allowing the control element to be operated without resistance noticeable to the user, and wherein at another time or at another position of the control element or at another position of the recording object, or a combination thereof, applying to the control element the dynamic force which is individually adjustable.

3. The method of claim 1, wherein the haptic feedback indicates an end stop or a limitation of a rotational range or of a sliding range or adjustment range, or a combination thereof.

4. The method of claim 1, wherein the haptic feedback represents a mark or a force pattern emulating a mechanical behavior.

5. The method of claim 1, further comprising determining at least one of the input or read-out parameters from the position of the recording object detected by a distance sensor.

6. The method of claim 1, further comprising
displaying and dynamically adjusting the position of the recording object on a display attached to a control unit or to the control element, and
marking the recording object as an active object.

7. The method of claim 1, further comprising
selecting the recording object on a touch screen of the control unit or the control element, and
tracking the selected recording object.

8. The method of claim 1, further comprising applying a defined additional force on the control element when the user moves the control element from a first object assignment range to a second object assignment range.

9. The method of claim 1, further comprising, when the control element is designed as a hand wheel having a circumferential display,
displaying a current display range on the circumferential display, and
continuously updating a visible portion of the current display range when a total setting range is spread over several rotations of the hand wheel.

10. The method of claim 1, further comprising projecting information into a recording set based on the entered or read-out parameters in dependence on the recording object or the changing state of the recording object or of the device, wherein the projected information does not interfere with a recording image.

11. The method of claim 1, wherein one of the entered or read-out parameters represent manual turning of a hand wheel by the user or an input from the control element, the method further comprising
calculating the dynamic force which supports manual turning or turns the hand wheel automatically to a defined position or in a defined direction at a defined speed, and
exerting with the electromechanical element on the control element the force which causes the control element to move automatically to the defined position or in the defined direction at the defined speed.

12. A method for controlling or regulating with a control element a motor for movement axes of devices in the film and broadcast sector, comprising:
controlling at least one motor via radio or cable with the control element by
applying a force to the control element with an electromechanical element that generates a haptic feedback when a tracked selected recording object that is held in a depth-of-field range or in another defined range threatens to leave the depth-of-field range or the other defined range, and
dynamically changing at least one of a strength, a duration and a position of the dynamic force using entered or read-out parameters generated in dependence on a recording object or a changing state of the recording object or of a state of at least one device selected from a motion control device, a swiveling camera head, a camera dolly, a camera crane, and a light control system,
while allowing a user to manually override the dynamic force.

13. The method of claim 12, wherein when the force generated by the electromechanical element on the control element at a certain time or depending on the position of the control element or a position of the recording object, or a combination thereof, is low or substantially non-existent, allowing the control element to be operated without resistance noticeable to the user, and wherein at another time or at another position of the control element or at another position of the recording object, or a combination thereof, applying to the control element the dynamic force which is individually adjustable.

14. The method of claim 12, wherein the haptic feedback indicates an end stop or a limitation of a rotational range or of a sliding range or adjustment range, or a combination thereof.

15. The method of claim 12, wherein the haptic feedback represents a mark or a force pattern emulating a mechanical behavior.

16. The method of claim 12, further comprising determining at least one of the input or read-out parameters from the position of the recording object detected by a distance sensor.

17. The method of claim 12, further comprising
displaying and dynamically adjusting the position of the recording object on a display attached to a control unit or to the control element, and
marking the recording object as an active object.

18. The method of claim 12, further comprising, when the control element is designed as a hand wheel having a circumferential display,
displaying a current display range on the circumferential display, and
continuously updating a visible portion of the current display range when a total setting range is spread over several rotations of the hand wheel.

19. A device for controlling or regulating a motor operatively connected to movement axes of equipment in the film and broadcast sector, said device comprising:
a processing unit,
a control unit having a control element connected at least indirectly to the motor via radio or cable, and
an electromechanical element connected to the control element capable of generating a dynamic force that provides a haptic feedback on the control element in a negative or positive direction of the control element when a tracked selected recording object that is held in a depth-of-field range or in another defined range threatens to leave the depth-of-field range or the other defined range, while allowing the user to intervene and to manually override the automatic movement at any time without actively switching, wherein the processing unit dynamically changes the dynamic force using entered or read-out parameters generated in dependence on a recording object or a changing state of the recording object or of a state of the equipment, wherein the equipment comprises at last one device selected from a motion control device, a swiveling camera head, a camera dolly, a camera crane, and a light control system.

20. The device of claim 19, wherein the control element comprises a hand wheel operated by the user, one of the parameters representing manual turning of the hand wheel by the user or an input from the control element, said processing unit calculating the dynamic force which supports the manual turning or turns the hand wheel automatically to a certain position or in one of the negative or positive direction at a defined speed.

21. The device of claim 19, further comprising an incremental or absolute position sensor disposed in the control element.

22. The device of claim 19, wherein the control element comprises a hand wheel with a circumferential display displaying a current display range and having a visible portion which is continuously updated when a total setting range is spread over several rotations of the hand wheel.

23. The device of claim 19, further comprising a distance sensor, wherein the processing unit is configured to
calculate at least one of the entered or read-out parameters from distance values measured by the distance sensor, and
generate therefrom a static or dynamic signal which is transferred via radio or cable for controlling the motor that generates the dynamic force for the haptic feedback on the control element.

24. A device for controlling or regulating a motor operatively connected to movement axes of equipment in the film and broadcast sector, said device comprising:
a processing unit,
a control unit having a control element connected at least indirectly to the motor via radio or cable, and
an electromechanical element connected to the control element capable of generating a dynamic force that provides a haptic feedback on the control element in a negative or positive direction of the control element and causes the control element to move automatically to defined points at a defined speed, while allowing the user to intervene and to manually override the automatic movement at any time without actively switching, wherein the processing unit dynamically changes the dynamic force using entered or read-out parameters generated in dependence on a recording object or a changing state of the recording object or of a state of the equipment, wherein the equipment comprises at last one device selected from a motion control device, a swiveling camera head, a camera dolly, a camera crane, and a light control system.

25. The device of claim 24, wherein the control element comprises a hand wheel operated by the user, one of the parameters representing manual turning of the hand wheel by the user or an input from the control element, said processing unit calculating the dynamic force which supports the manual turning or turns the hand wheel automatically to a certain position or in one of the negative or positive direction at a defined speed.

26. The device of claim 24, further comprising an incremental or absolute position sensor disposed in the control element.

27. The device of claim 24, wherein the control element comprises a hand wheel with a circumferential display displaying a current display range and having a visible portion which is continuously updated when a total setting range is spread over several rotations of the hand wheel.

28. The device of claim 24, further comprising a distance sensor, wherein the processing unit is configured to
calculate at least one of the entered or read-out parameters from distance values measured by the distance sensor, and
generate therefrom a static or dynamic signal which is transferred via radio or cable for controlling the motor that generates the dynamic force for the haptic feedback on the control element.

* * * * *